US008278599B2

(12) United States Patent
Patterson

(10) Patent No.: US 8,278,599 B2
(45) Date of Patent: Oct. 2, 2012

(54) BELT DRIVE FOR FEEDING WELDING WIRE

(75) Inventor: Jon Michael Patterson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 361 days.

(21) Appl. No.: 12/757,180

(22) Filed: Apr. 9, 2010

(65) Prior Publication Data

US 2010/0314373 A1    Dec. 16, 2010

Related U.S. Application Data

(60) Provisional application No. 61/186,186, filed on Jun. 11, 2009.

(51) Int. Cl.
*B23K 9/12* (2006.01)
(52) U.S. Cl. ............... 219/136; 219/145; 219/137.7
(58) Field of Classification Search ............... 219/78.02, 219/136, 137.7, 145
See application file for complete search history.

(56) References Cited

U.S. PATENT DOCUMENTS 5,521,355 A * 5/1996 Lorentzen ............. 219/137.7

FOREIGN PATENT DOCUMENTS

| EP | 1574277 A2 | 9/2005 |
|----|----|----|
| JP | 58189079 U | 12/1983 |
| JP | 61098768 U | 6/1986 |
| JP | 6087370 U | 12/1994 |
| JP | 11199133 A | 7/1999 |

OTHER PUBLICATIONS

International Search Report for application No. PCT/EP2010/035946 mailed Sep. 20, 2010.

* cited by examiner

*Primary Examiner* — Dung A. Le
(74) *Attorney, Agent, or Firm* — Fletcher Yoder, P.C.

(57) ABSTRACT

A welding wire feed drive system is provided including belts mounted on wire drive rollers. One or both belts may be poly-V belts mounted on the rollers and positioned such that grooves of the belts are outward facing. Opposing grooves and projections of the belts may form an interfacing or interlocking arrangement suitable for the securement of a welding wire therein. The grooves and projections of the belts may be utilized to facilitate the movement of the welding wire towards a welding application.

20 Claims, 4 Drawing Sheets

BELT DRIVE FOR FEEDING WELDING WIRE

CROSS REFERENCE TO RELATED APPLICATIONS

This application is a Non-Provisional patent application of U.S. Provisional Patent Application No. 61/186,186, entitled "Apparatus for Feeding Welding Wire During a Welding Process Using a Poly-V Belt Drive", filed Jun. 11, 2009, which is herein incorporated by reference.

BACKGROUND

The invention relates generally to wire feeding systems, and, more particularly, to wire feed drive systems.

Welding is a process that has become increasingly ubiquitous in various industries and applications. While such processes may be automated in certain contexts, a large number of applications continue to exist for manual welding operations. Such welding operations rely on a variety of control schemes to ensure the supply of welding consumables (e.g., wire feed, shielding gas, etc.) is provided to the weld in an appropriate amount at the desired time. For example, metal inert gas (MIG) welding relies on a proper welding wire feed rate to prevent weld splatter and arc outage. In many instances, a proper wire feed may be defined by parameters such as wire feed speed, consistency of the wire feed, and so forth.

To ensure that a proper wire feed is maintained throughout a welding operation, a wire drive system is typically utilized to unspool wire from a wire spool and to feed the wire to a welding torch. Such wire drive systems may include drive rollers that grip the wire, pull the wire off the wire spool, and push the wire toward the welding torch. Unfortunately, since there is typically a small contact area between the drive rolls and the wire, a substantial force is applied to the wire during feeding. Such a force may lead to deformation of the wire, and can even cause the wire to break, or result in small wire shavings being separated from the moving wire strand. These shavings may become lodged inside components of the welding system, such as the welding torch, compromising the quality of the weld. Accordingly, there exists a need for improved wire feeding systems that overcome such limitations.

BRIEF DESCRIPTION

In an exemplary embodiment, a welding wire drive system includes a drive roll system including a first roller and a second roller, at least one of which serves as a drive roller. The system also includes a first belt including a first series of generally v-shaped grooves and a first series of generally v-shaped projection, the belt being adapted to be mounted on the first roller in a back-driven configuration with the grooves and projections facing outward from a surface of the first drive roller. The wire feed drive system also includes a second belt including a second series of generally v-shaped groove and a second series of generally v-shaped projection and being adapted to be mounted on the second roller in a back-driven configuration with the second grooves and the second projections facing outward from a surface of the second roller. The first belt and the second belt form an interfacing arrangement adapted to receive a welding wire and feed the welding wire to a welding torch.

In another embodiment, a welding wire drive system includes a drive roll system including a first roller and a second roller, as well as a first belt including a groove and a projection, and a second belt with a groove and a projection. The first belt is adapted to be mounted on the first roller in a back-driven configuration with the groove and the projection facing outward from a surface of the drive roller. The second belt is adapted to be mounted on the second roller and to form an interfacing arrangement with the groove and the projection of the first belt, wherein the interlocking arrangement is adapted to receive a welding wire and feed the welding wire to a welding torch.

In another embodiment, a welding wire drive system includes a drive roll system including a first drive roller and a second drive roller. The wire drive system also includes a first belt including a first groove and a first projection and being adapted to be mounted on the first roller in a back-driven configuration with the first groove and the first projection facing outward from a surface of the first roller. The wire drive system also includes a second belt adapted to be mounted on the second roller, wherein the first belt and the second belt form an interlocking arrangement adapted to receive a welding wire.

DRAWINGS

These and other features, aspects, and advantages of the present invention will become better understood when the following detailed description is read with reference to the accompanying drawings in which like characters represent like parts throughout the drawings, wherein.

Figure 11:
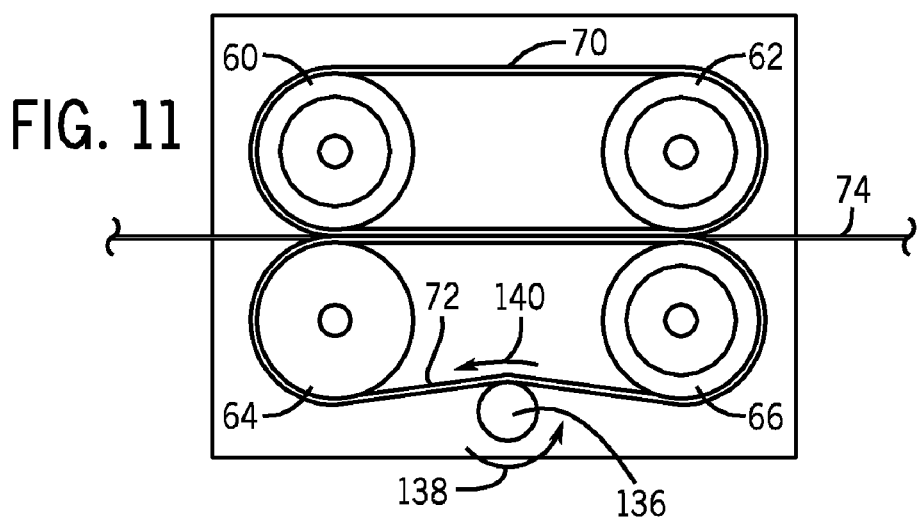
Figure 12:
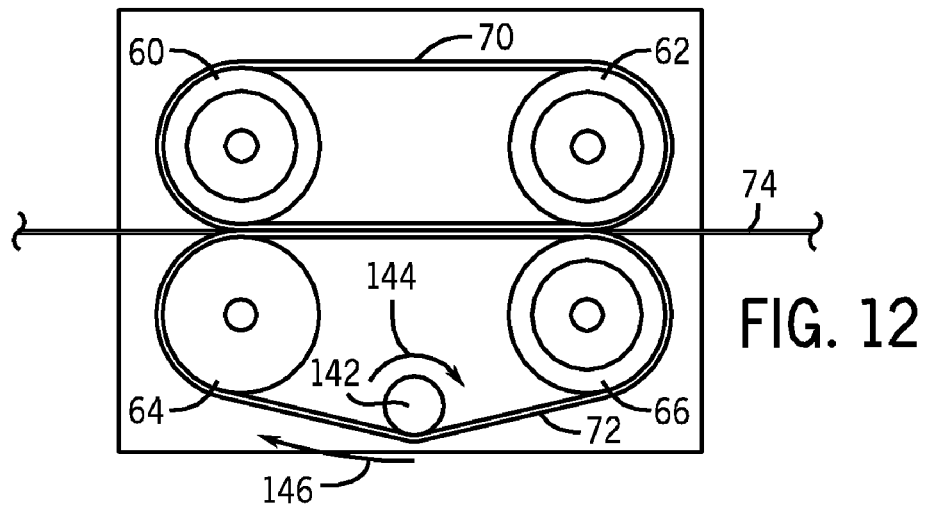

FIG. 11 is a schematic illustrating an exemplary belt guide that may be utilized to rotate one or more belts around one or more drive rollers of a wire drive system in accordance with aspects of the present invention; and FIG. 12 is a schematic illustrating an exemplary belt guide that may be utilized to rotate one or more belts around one or more drive rollers of a wire drive system in accordance with aspects of the present invention.

DETAILED DESCRIPTION

As described in detail below, embodiments are provided of a welding wire drive system including one or more back-driven belts mounted on wire drive rollers or pulleys, as referred to generally in the following discussion as "rollers". That is, in embodiments of the present invention, one or more belts may include grooves and projections, which may be generally v-shaped, may be coupled to wire rollers of a welding wire system, one or more of which may serve as a drive roller for driving the belt(s) in continuous circulation to drive welding wire. Where the belt(s) are grooved, the wire may be positioned in opposing grooves or between a groove and a projection, the arrangement forming one of a variety of possible interfacing arrangements suitable for driving the welding wire. As such, the grooves and projections of the belts may be utilized to facilitate both drawing the welding wire from the wire spool and driving the wire through a weld cable to a welding torch. In some embodiments, the belts may be offset with respect to one another such that the welding wire is positioned between a projection of one belt and a groove of another belt. The sizes of the grooves and projections of the belts may be varied along the length of the belts such that a single belt combination may support the feeding of welding wires of different diameters.

Figure 1:
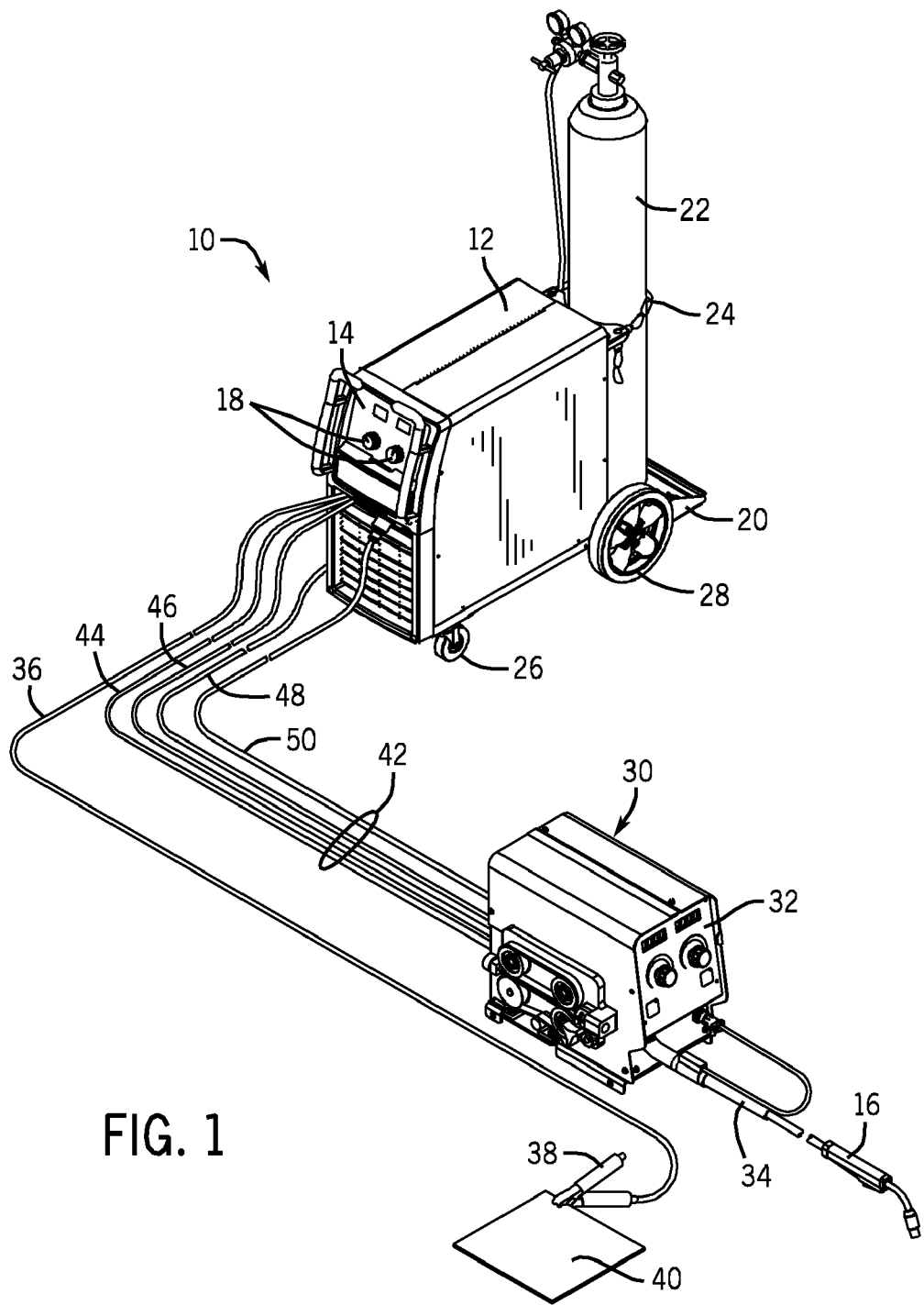
FIG. 1 is a perspective view of an exemplary welding system including a welder and a wire feeder in accordance with aspects of the present invention.

Turning now to the drawings, FIG. 1 illustrates an exemplary welding system 10 which powers, controls, and provides supplies to a welding operation. The welding system 10 includes a welder 12 having a control panel 14 through which a welding operator may control the supply of welding materials, such as shielding gas, welding wire, and so forth, to a welding gun 16. To that end, the control panel 14 includes input or interface devices, such as knobs 18 that the operator may use to adjust welding parameters (e.g., voltage, current, etc.). The welder 12 may also include a tray 20 mounted on a back of the welder 12 and configured to support a gas cylinder 22 held in place with a chain 24. The gas cylinder 22 is the source of the gas that supplies the welding torch 16. Furthermore, the welder 12 may be portable via a set of smaller front wheels 26 and a set of larger back wheels 28, which enable the operator to move the welder 12 to the location of the weld.

The welding system 10 also includes a wire feeder 30 that provides welding wire to the welding torch 16 for use in the welding operation. The wire feeder 30 may include a control panel 32 that allows the user to set one or more wire feed parameters, such as wire feed speed. Additionally, the wire feeder 30 may house a variety of internal components, such as a wire spool, a wire feed drive system, a motor, and so forth. In presently contemplated embodiments, the wire feeder 30 may house a wire feed drive system including rollers that support drive belts. That is, the wire feed mechanism internal to the wire feeder 30 may feature one or more belts positioned about the rollers, and the belts may include grooves and projections that interface to hold and drive the wire, spreading the contact area between the belts and the wire far beyond that obtainable with conventional arrangements in which drive rolls contact the wire directly. Such an arrangement may facilitate the feeding of welding wire to the welding torch 16 as the belts contact the welding wire and feed the wire to the torch. The grooves of opposing belts may be positioned relative to one another in a variety of ways suitable for the feeding of welding wire, as discussed in more detail below.

A variety of cables couple the components of the welding system 10 together and facilitate the supply of welding materials to the welding torch 16. A first cable 34 couples the welding gun 16 to the wire feeder 30. A second cable 36 couples the welder 12 to a work clamp 38 that connects to a workpiece 40 to complete the circuit between the welder 12 and the welding torch 16 during a welding operation. A bundle 42 of cables couples the welder 12 to the wire feeder 30 and provides weld materials for use in the welding operation. The bundle 42 includes a feeder power lead 44, a weld cable 46, a gas hose 48, and a control cable 50. Depending on the polarity of the welding process, the feeder power lead 44 connects to the same weld terminal as the cable 36. It should be noted that the bundle 42 of cables may not be bundled together in some embodiments.

Modifications to the exemplary welding system 10 of FIG. 1 may be made in accordance with aspects of the present invention. For example, the tray 20 may be eliminated from the welder 12 and the gas cylinder 22 may be located on an auxiliary support cart or in a location remote from the welding operation. Furthermore, although the illustrated embodiments are described in the context of a constant voltage MIG welding process, the features of the invention may be utilized with a variety of other suitable welding systems and processes. For instance, the wire feeder may be used with any wire feeding process, such as gas operations (gas metal arc welding (GMAW)) or gasless operations (shielded metal arc welding (SMAW)). For further example, the wire feeder may be used in metal inert gas (MIG) welding or stick welding.

It should also be noted that the wire feeder may be separate from the power supply, or may be integrated into the same enclosure or housing. Both arrangements may incorporate the unique wire drive techniques described herein. Similarly, the components described may be reduced in size for incorporation into other welding wire feeding components, such as so-called spool guns, in which a small spool of welding wire is held as part of a welding torch. Still further, the belt drive approach described may be incorporated, in miniaturized fashion, into welding torches that pull wire from a remote spool, such as those typically designed for aluminum wire that can support less column loading than steel wire.

Figure 2:
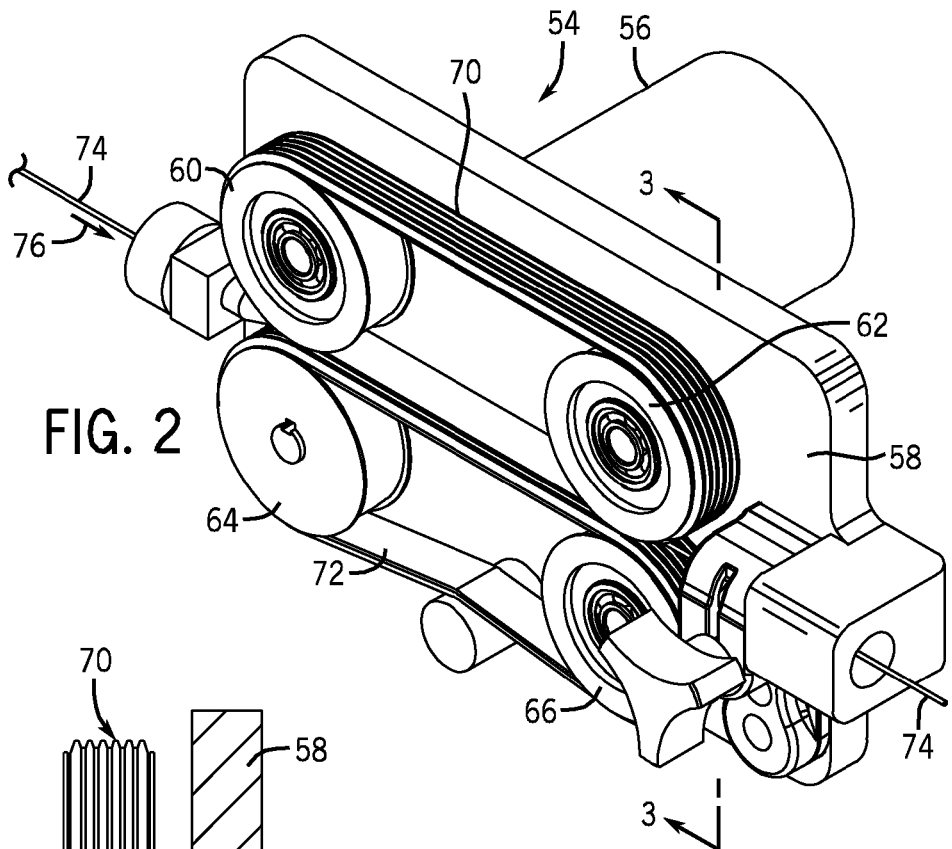
FIG. 2 is a perspective view of an exemplary wire drive system that may be internal to the wire feeder of FIG. 1 in accordance with aspects of the present invention.

FIG. 2 is a perspective view of an exemplary wire drive system 54 that may be internal to the wire feeder of FIG. 1. The wire drive system 54 includes a motor 56, a support 58, a first roller 60, a second roller 62, a third roller 64, a fourth roller 66, and a wire guide assembly 68. In this exemplary arrangement, a first back-driven poly-V belt 70 is disposed about the first roller 60 and the second roller 62. A second back-driven poly-V belt 72 is disposed about the drive roller 64 and the fourth roller 66. That is, in the illustrated embodiment, the poly-V belts 70 and 72 are positioned with their respective generally v-shaped grooves facing outward from the surfaces of the drive rollers 60, 62, 64, and 66. A wire 74 is positioned between the first poly-V belt 70 and the second poly-V belt 72.

The belts illustrated may be of a type used in other applications, such as on grooved pulleys of internal combustion engines, electric motor/load belt drives, and so forth. However, the belts here are "back-driven", meaning that rather than having the grooves and intermediate protrusions facing the interior of the continuous loop, they face outwardly so that the welding wire can be positioned in one of the grooves. Additionally, the belts could be conventional-driven by using a drive roller against the outside, or v-groove side, of the belt. Moreover, as described below, the belts may include multiple grooves and protrusions, and hence the term "poly-V" belt may be used. However, embodiments of the invention may be based upon belts with a single groove. Similarly as described below, it is possible to employ a belt with only a single groove, or belts that are specially made for this application, such as belts with grooves of different size, shape, and so forth. Thus, where reference is made in this discussion to "v-shaped" grooves or projections, it should be understood that these may be actually in the shape of the letter V, or may have a flat bottom or top, various angles, and so forth.

During operation of the wire feeder, the wire drive system 54 is adapted to pull welding wire 74 through the poly-V belts 70 and 72 in the direction of arrow 76. In some embodiments, the wire may be routed through an inlet guide that receives the wire and feeds it to the poly-V belts 70 and 72. The poly-V belts 70 and 72 are configured to rotate about the drive rollers 60, 62, 64, and 66 and compress the wire 74 in a channel formed between opposing v-grooves (or between a groove of one belt and a projection of the other) in order to advance the wire towards the welding torch. The motor 56 facilitates wire advancing by driving one or more of the rollers. As will be appreciated by those skilled in the art, it will typically be preferred that a downstream roller serve as a drive roller so as to pull the associated belt, although other or multiple rollers may be driven. The non-driven rollers may serve as idlers only, holding the associated belt firmly in place and guiding the belt along its continuous circulating path. All such rollers will typically be mounted on anti-friction bearings in a manner well known in the art.

The embodiment of FIG. 2 illustrates a four roller drive system 54 including the four rollers 60, 62, 64, and 66 that provide opposing pressure on the wire to advance the wire towards the welding torch. However, it should be noted that the back-driven poly-V belts may be utilized with a variety of other wire drive systems. For example, the back-driven poly-V belts may be incorporated into a two roll drive system. Such an embodiment may be advantageous in welding applications with space or cost constraints. Still further, the poly-V belts could be incorporated into wire drive systems with any number of drive rollers (e.g., 6 rollers, 8 rollers, etc.). Furthermore, although not shown in FIG. 2, any of a variety of intermediate structures may be positioned between the rollers to maintain contact between the rollers, the belts, and the welding wire.

Figure 3:
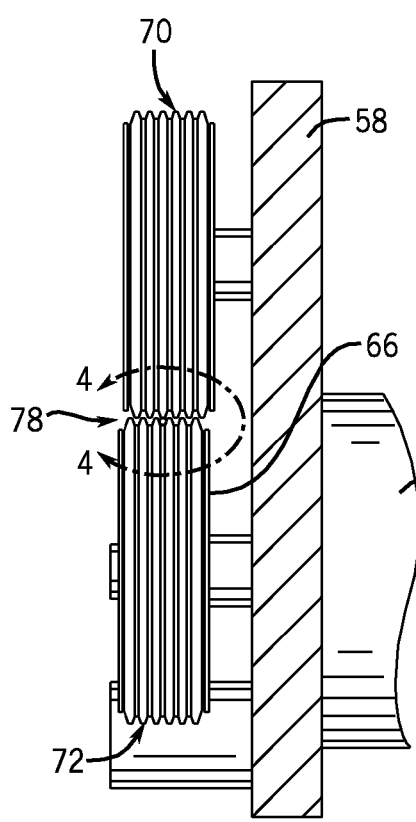
FIG. 3 is a side view of an exemplary pair of drive rollers with an exemplary pair of multi-grooved belts mounted thereon in accordance with aspects of the present invention.

FIG. 3 is a side view of the second roller 62 and the fourth roller 66 with the mounted poly-V belts 70 and 72. As shown, the v-grooves of the poly-V belts 70 and 72 are positioned so as to form an interfacing arrangement 78, in this case an interlocking arrangement. The interfacing arrangement 78 may feature the opposing v-grooves positioned in a variety of ways (e.g., opposite v-grooves offset from one another, or opposite v-grooves aligned). However, the welding wire is adapted to securely fit within the interfacing arrangement 78. Furthermore, in some embodiments, the poly-V belts may be electrically isolating so as to isolate the rollers from the current in the welding wire. Additionally, the interfacing arrangement 78 may be advantageous since a single poly-V belt may be amenable to welding with a variety of types of wire, such as aluminum, titanium, steel, stainless steel, and so forth.

Figure 4:
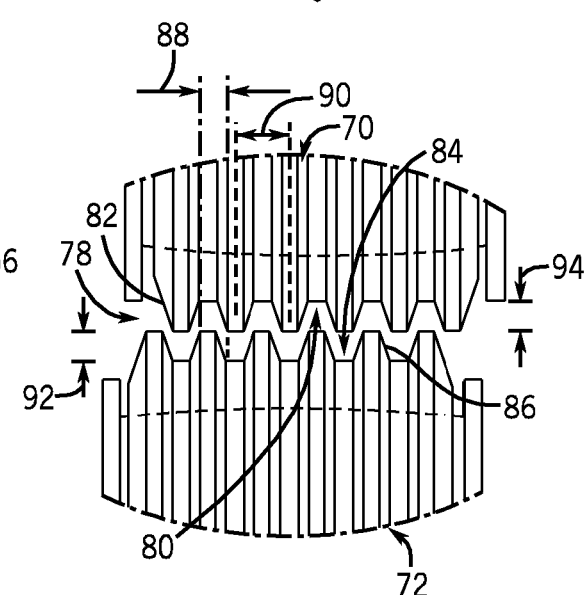
FIG. 4 illustrates an exemplary interfacing arrangement that may be formed between v-grooves of exemplary belts in accordance with aspects of the present invention.

FIG. 4 illustrates the interfacing arrangement 78 of the v-grooves of the poly-V belts 70 and 72 in more detail. As shown, the poly-V belt 70 includes v-grooves 80 that alternate with v-projections 82 along the length of the poly-V belt 70. Similarly, the poly-V belt 72 includes v-grooves 84 that alternate with v-projections 86 along the length of poly-V belt 72. In the illustrated embodiment, the v-projections 82 of the first belt 70 are offset by an offset distance 88 from the v-projections 86 of the second belt 72. In some embodiments, the offset distance 88 may be equal to approximately one half of the pitch 90 of the v-grooves 84. In other embodiments, the offset distance 88 between the first belt 70 and the second belt 72 may be any other suitable distance such that welding wire may be secured between the first belt 70 and the second belt 72 during operation.

In the illustrated embodiment, the offset distance 88 is a suitable distance to facilitate the alignment of the v-grooves 84 of the second belt 72 with the v-projections 82 of the first belt 70. Likewise, the illustrated offset distance 88 facilitates the alignment of the v-grooves 80 of the first belt 70 with the v-projections 86 of the second belt 72. Furthermore, in the embodiment illustrated, a height 92 of the v-projections 86 of the second belt 72 is approximately equal to a height 94 of the v-projections 82 of the first belt 70. The foregoing feature may facilitate a proper wire feed since the wire may be adapted to contact portions of both the first belt 70 and the second belt 72 during use.

Again, in the illustrated embodiment, the grooves and projections are generally v-shaped. However, it should be noted that in presently contemplated embodiments, the grooves and projections may be any of a variety of other suitable shapes. For instance, the grooves and the projections may be generally rectangular, square, triangular, u-shaped and so forth. Indeed, although the illustrated embodiments show poly-V belts, any other suitable belt with grooves and projections that may be adapted to form an interfacing or interlocking arrangement may be utilized as well.

Figure 5:
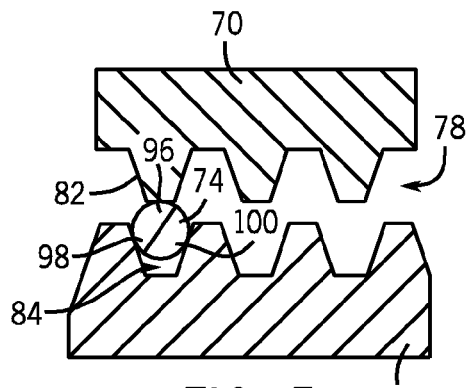
FIG. 5 is a schematic illustrating an exemplary embodiment of an offset interfacing arrangement with a welding wire positioned therein in accordance with aspects of the present invention.

FIG. 5 is a schematic illustrating an exemplary embodiment of the interfacing arrangement 78. This embodiment features an offset interfacing arrangement 78 in which the projection 82 of the first belt 70 is substantially aligned with the groove 84 of the second belt 72. The welding wire 84 in this arrangement is securely positioned between the projection 82 of the first belt 70 and the groove 84 of the second belt 72. That is, a first point of contact 96 is established between the welding wire 74 and the projection 82, a second point of contact 98 is established between the welding wire 74 and the groove 84, and a third point of contact 100 is established between the welding wire 74 and the groove 84. In total, in this embodiment, the welding wire 74 contacts the belts 70 and 72 at three locations 96, 98, and 100. Such a positioning of the welding wire 74 may increase the number of contact points established between the wire and the drive mechanism as compared to traditional designs. Such a feature may be advantageous because multiple contact points may increase the grip on the wire, thereby facilitating the pulling of the wire off a wire spool and the feeding of the wire to the welding torch.

Figure 6:
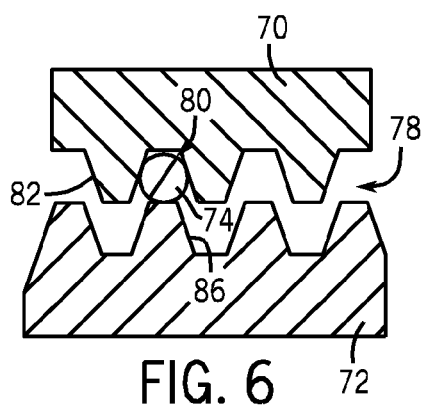
FIG. 6 is a schematic illustrating an exemplary embodiment of an offset interfacing arrangement with a welding wire positioned therein in accordance with aspects of the present invention.

FIG. 6 is a schematic illustrating another exemplary embodiment of the interfacing arrangement 78. This embodiment features an offset interfacing arrangement 78 in which the projection 86 of the second belt 72 is substantially aligned with the groove 80 of the first belt 70. The welding wire 84 in this arrangement is securely positioned between the projection 86 of the second belt 72 and the groove 80 of the first belt 70. Although the welding wire 74 of FIGS. 5 and 6 is positioned adjacent to the first projections 82 and 86 of the belts 70 and 72, respectively, in other embodiments, the welding wire may be positioned in a similar way between any of the grooves and projections of the belts. Furthermore, the welding wire may be positioned between the first projection and groove of the belts until the first projection and the first groove become worn through repeated use. Subsequently, the welding wire may be positioned between the next groove and projection and so on until all the grooves and projections along the length of the belts become worn from use. In this way, the utility of the belt may be maximized by utilizing all the grooves and projections along the length of the belts.

Figure 7:
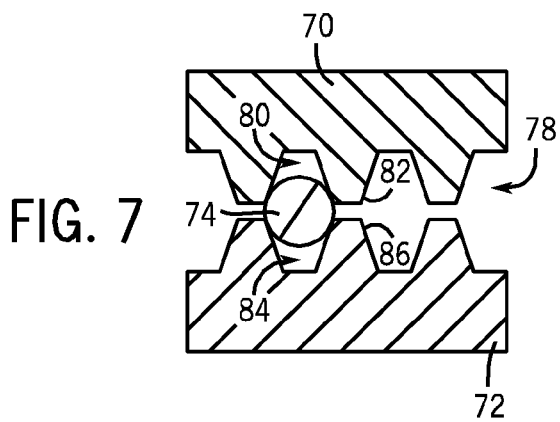
FIG. 7 is a schematic illustrating an exemplary embodiment of an aligned interfacing arrangement with a welding wire positioned therein in accordance with aspects of the present invention.

FIG. 7 is a schematic illustrating another embodiment of the interfacing arrangement 78 featuring alignment between the first belt 70 and the second belt 72. That is, in this embodiment, the groove 80 of the first belt 70 and the groove 84 of the second belt 72 are aligned. Likewise, the projection 82 of the first belt 70 and the projection 86 of the second belt 72 are aligned. The welding wire 74 is positioned between the groove 80 and the groove 84. However, in further embodiments, the welding wire 74 may be positioned between the projection 82 and the projection 86.

Figure 8:
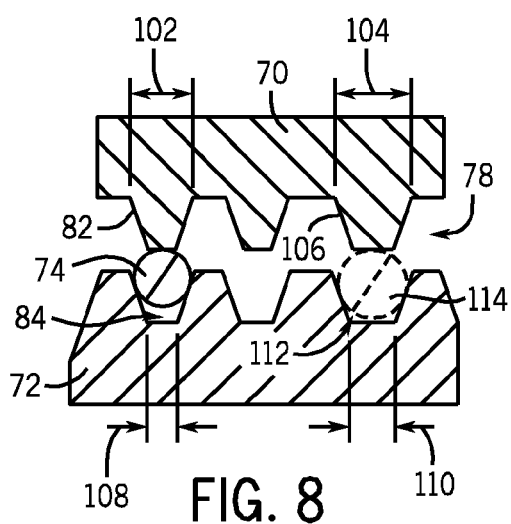
FIG. 8 is a schematic illustrating an exemplary embodiment of a variably sized interfacing arrangement with welding wires of multiple diameters positioned therein in accordance with aspects of the present invention.

FIG. 8 is a schematic illustrating a further embodiment of the interfacing arrangement 78 in which the projections and the grooves of the belts are unequally sized and spaced along the length of the belts. That is, the first projection 82 of the first belt 70 has an inner width 102, which is smaller than an inner width 104 of a last projection 106 of the first belt 70. Likewise, the first groove 84 of the second belt 72 has an inner width 108, which is smaller than an inner width 110 of a last groove 112 of the second belt 72. Such features may enable the belts 70 and 72 to be utilized with welding wire of varying diameters. For example, in the illustrated embodiment, the first welding wire 74 is positioned between the projection 82 of the first belt 70 and the groove 84 of the second belt 72. The projection 82 and the groove 84 are sized for use with the welding wire 74. However, a second welding wire 114, which has a diameter greater than a diameter of the first welding wire 74, is positioned between the larger projection 106 and the larger groove 112. It should be noted that although the illustrated embodiment shows two welding wires positioned between the belts 70 and 72, during typical use, only a single wire may be positioned between the belts. However, in other embodiments, such as in twin-wire applications, it may be desirable to deliver two wires to the weld joint simultaneously. Whereas traditional systems may utilize two separate wire feeders to achieve a dual wire feed, embodiments of the present invention may enable two or more wires to be simultaneously delivered with a single system by utilizing the plurality of provided grooves. However, the same belts 70 and 72 may be used when the smaller diameter wire 74 is desired as well as when the larger diameter wire 114 is desired. Indeed, a belt may be designed such that it accommodates more than two welding wire types and/or wire sizes as desired.

Figure 9:
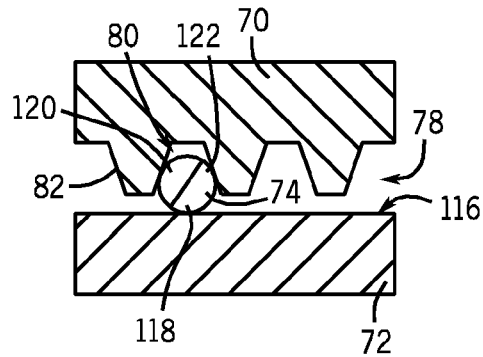
FIG. 9 is a schematic illustrating an exemplary embodiment of an interfacing arrangement between a grooved belt and a non-grooved belt with a welding wire positioned therein in accordance with aspects of the present invention.

FIG. 9 is a schematic illustrating a further embodiment of the first belt 70 and the second belt 72. In this embodiment, the first belt 70 is a back-driven poly-V belt, as before. However, the second belt 72 is flat along a surface 116 facing the v-projections 82 of the first belt 70. Accordingly, in this embodiment, the welding wire 74 is positioned for use between the flat surface 116 of the second belt 72 and the groove 80 of the first belt 70. As shown, the wire 74 contacts the flat surface 116 of the second belt 72 at a first point of contact 118. The wire 74 also contacts the first belt 70 at a second point of contact 120 and a third point of contact 122. It should be noted that in another embodiment, the first belt 70 may feature a flat surface, and the second belt 72 may include the v-grooves and v-projections. Still further, the welding wire 74 may be located between projection 82 of the first belt 70 and the flat surface 116 of the second belt 72.

It should be noted that the belts 70 and 72 and the drive rollers 60, 62, 64, and 66 may be adapted further to facilitate proper alignment of the wire path through the grooves of the opposing belts. For example, in one embodiment, the belts 70 and 72 may feature grooves on both sides of the belts, and the rollers 60, 62, 64, and 66 may also feature grooves. In such an embodiment, the grooves on the backside of the belts may be adapted to mate with the grooves on the rollers. The foregoing feature may have the effect of increasing the traction between the belts and the rollers as the belts are driven around the rollers. Additionally, such a feature may enable precise alignment between the v-grooves of the first belt and the v-grooves of the second belt, thus ensuring that the wire being fed to the welding torch remains substantially in line throughout the wire feeding process.

Figure 10:
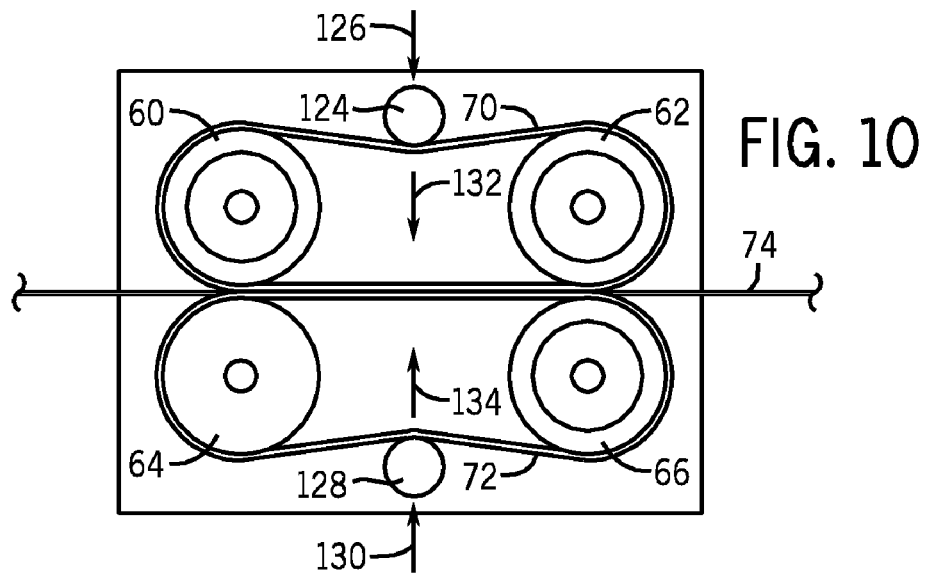
FIG. 10 is a schematic illustrating exemplary belt guides that may be utilized to secure one or more belts on drive rollers of a wire drive system in accordance with aspects of the present invention.

FIG. 10 is a schematic illustrating how the belts may be secured on the drive rollers of the wire feed drive system in one embodiment. Specifically, FIG. 10 illustrates the drive rollers 60, 62, 64, and 66 with the belts 70 and 72 mounted thereon. In this embodiment, a first guide 124 applies pressure, as indicated by arrow 126, on the first belt 70 to ensure the belt 70 remains taut during operation. Likewise, a second guide 128 applies pressure, as indicated by arrow 130, on the second belt 72 to ensure the belt 72 remains tight during use. It should be noted that as the belts 70 and 72 stretch or wear, one or more adjustment mechanisms may be provided to compensate for deformities. For example, the guides 124 and 128 may be adapted to move closer to the wire, as indicated by arrows 132 and 134 as the belts stretch or wear. Indeed, any of a variety of suitable adjustment features, which may be manual or automatic, may be employed to compensate for stretch and/or wear in the belts over time.

FIGS. 11 and 12 are schematic illustrations of further embodiments of the wire feed drive system. Specifically, FIG. 11 is a schematic including the drive rollers 60, 62, 64, and 66 with belts 70 and 72 mounted thereon, as before. In this embodiment, a belt guide 136 rotates in a direction indicated by arrow 138. As the belt guide 136 rotates, the second belt 72 rotates in the direction indicated by arrow 140. Such rotation forces the wire through the drive rollers toward the welding torch. Similarly, the embodiment of FIG. 12 includes a belt guide 142 that rotates in the direction of arrow 144. As the belt guide 142 rotates, the belt 72 rotates about the drive rollers in the direction indicated by arrow 146. Again, such rotation facilitates the movement of the welding wire 74 toward the welding torch.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding wire drive system, comprising:
a drive roll system comprising a first roller and a second roller, at least one of the rollers serving as a drive roller;
a first belt comprising a first groove and a first projection and being configured to be mounted on the first roller with the first groove and the first projection facing outward from a surface of the first drive roller; and
a second belt comprising a second groove and a second projection and being configured to be mounted on the second roller with the second groove and the second projection facing outward from a surface of the second roller,
wherein the first belt and the second belt form an interfacing arrangement configured to receive a welding wire and to feed the welding wire towards a welding application.

2. The welding wire drive system of claim 1, wherein the interfacing arrangement comprises an offset arrangement wherein the first projection is substantially aligned with the second groove.

3. The welding wire drive system of claim 2, wherein the first and second belts each comprise multiple grooves and multiple projections forming a series having a pitch, and wherein a first edge of the first projection is offset from a first edge of the second projection by approximately one half of the pitch.

4. The welding wire drive system of claim 1, wherein the interfacing arrangement comprises an aligned arrangement wherein the first groove is substantially aligned with the second groove.

5. The welding wire drive system of claim 1, wherein the interfacing arrangement comprises an aligned arrangement wherein the first projection is substantially aligned with the second projection.

6. The welding wire drive system of claim 1, wherein:
the first belt comprises a third groove and a third projection, and wherein an inner width of the third groove is substantially larger than an inner width of the first groove and an inner width of the third projection is substantially larger than an inner width of the first projection;
the second belt comprises a fourth groove and a fourth projection, and wherein an inner width of the fourth groove is substantially larger than an inner width of the second groove and an inner width of the fourth projection is substantially larger than an inner width of the second projection.

7. The welding wire drive system of claim 1, comprising a first guide and a second guide, wherein the first guide is configured to apply pressure to the first belt to maintain the first belt in a taut configuration and the second guide is configured to apply pressure to the second belt to maintain the second belt in a taut configuration.

8. The welding wire drive system of claim 1, comprising a first guide configured to apply inward pressure on the second belt and to rotate to maintain the second belt taut around the second roller and to rotate the belt around the second roller.

9. The welding wire drive system of claim 1, comprising a first guide configured to apply outward pressure on the second belt and to rotate to maintain the second belt taut around the second roller and to rotate the belt around the second roller.

10. The welding wire drive system of claim 1, wherein the drive roll system further comprises a third roller and a fourth roller, and wherein the first belt is configured to be mounted on the third roller and the second belt is configured to be mounted on the fourth roller.

11. The welding wire drive system of claim 1, wherein the welding wire drive system is incorporated into a wire feeder separate from but configured to be coupled to a welding power supply.

12. A welding wire drive system, comprising:
a drive roll system comprising first roller, a second roller, a third roller and a fourth roller, at least one of the rollers serving as a drive roller;
a first belt comprising a groove and being configured to be mounted on the first and second rollers with the groove facing outward from the first and second rollers; and
a second belt configured to be mounted on the third and fourth rollers and to form an interfacing arrangement with the groove and the projection of the first belt, wherein the interfacing arrangement is configured to receive a welding wire and to feed the welding wire towards a welding application.

13. The welding wire drive system of claim 12, wherein the first belt comprises a second groove, and wherein an inner width of the second groove is substantially larger than an inner width of the groove.

14. The welding wire drive system of claim 12, wherein each of the first and second belts comprises a plurality of grooves for receiving and driving welding wire.

15. The welding wire drive system of claim 12, wherein the groove is substantially v-shaped.

16. The welding wire drive system of claim 12, wherein the first and second belts are configured to interface to receive welding wire in a channel between the groove of the first belt and a flat surface of the second belt.

17. The welding wire drive system of claim 12, wherein the first and second belts are configured to interface to receive welding wire in a channel between the groove of the first belt and a groove or a projection of the second belt.

18. A welding wire drive system, comprising:
a drive roll system comprising a first roller, a second roller, and at least one additional roller, at least one of the rollers serving as a drive roller;
a first belt comprising a first groove and a first projection and configured to be mounted on the first roller with the first groove and the first projection facing outward from a surface of the first roller; and
a second belt configured to be mounted on the second roller, wherein the first belt and the second belt form an interlocking arrangement configured to receive a welding wire.

19. The wire feed drive system of claim 18, wherein the second belt comprises a second groove and a second projection and the second belt is configured to be mounted on the second roller with the second groove and the second projection facing outward from a surface of the second roller.

20. The welding wire drive system of claim 18, wherein the first belt comprises a second groove and a second projection, and wherein an inner width of the second groove is substantially larger than an inner width of the first groove and an inner width of the second projection is substantially larger than an inner width of the first projection.

* * * * *